3,689,403
FCC CATALYST SECTION CONTROL
Bernard C. Long, Woodbury, N.J., assignor to
Mobil Oil Corporation
Filed Dec. 7, 1970, Ser. No. 95,597
Int. Cl. C10g *13/18*
U.S. Cl. 208—164        3 Claims

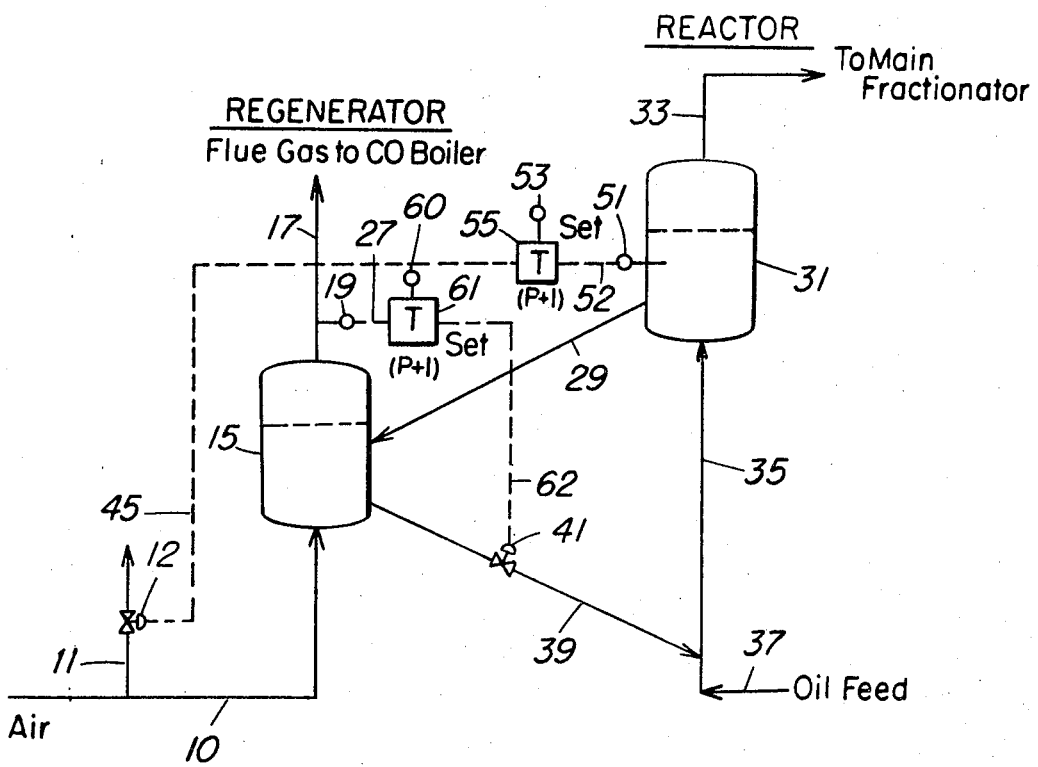

ABSTRACT OF THE DISCLOSURE

The specific embodiments provide for controlling a catalyst section of a fluid catalytic cracking system by adjusting the flow rate of an oxygen-containing gas to a regenerator in response to a deviation of a reactor temperature from a predetermined reactor temperature, and by adjusting the regenerated catalyst flow rate in response to a deviation of the flue gas temperature from a predetermined flue gas temperature.

BACKGROUND OF THE INVENTION

Field of the invention

This invention relates to an improved method and apparatus for controlling a fluid catalytic cracking system. More specifically, the present invention relates to a method and an apparatus for providing rapid and stable reactor and regenerator responses to disturbances.

DESCRIPTION OF THE PRIOR ART

Fluid catalytic cracking has been known and commercially employed for many years. In general, a fluid catalytic cracking system comprises a catalyst section wherein a reactor inlet line is charged with fresh feed which is usually preheated and at least one recycle stream. The charge stream picks up regenerated catalyst from a regenerated catalyst line or standpipe, and is passed into the reactor. Within the reactor, the catalyst is maintained in a dense phase which, with respect to its physical properties, acts much like a liquid. Products are removed from the reactor in the vapor phase and passed to a products recovery section comprising at least one main fractionator or distillation column for separation into desired products. Catalyst, which has been coked by the cracking reaction in the reactor, is continuously passed from the reactor by a spent catalyst transfer line to a regenerator. In the regenerator, the coke is burnt from the catalyst by contact with an oxygen-containing gas. Flue gas is passed from the regenerator, and the regenerated catalyst is recirculated to the reactor by the standpipe where it is picked up by the reactor charge stream. Typical fluid catalyst cracking systems are disclosed in U.S. Pat. Nos. 3,206,393 and 3,261,777.

The quantity of oxygen-containing gas for regeneration is an important control variable in that an excess of oxygen causes "afterburning" of carbon monoxide in the dilute phase of the regenerator which causes high temperatures. On the other hand, an insufficient amount of oxygen provides inadequate removal of the carbon from the catalyst and thus introduces a limiting feature to the entire fluid catalytic cracking process.

Automatic means for controlilng a fluid catalytic cracking process are steadily gaining acceptance as a result of the capacity of computers to solve many of the control problems encountered in the processes. One form of automatic control of a fluid catalytic cracking process is to provide a digital computer programmed with a model of the overall process, and to feed the digital computer with input variables which are measured within the fluid catalytic cracking process. Computations as defined by the model are then made in response to the measured input variables to provide control signals for adjusting the set points of conventional analog controllers. With such a control system, the underlying primary analog loops should adequately regulate to compensate for disturbances such as temperature changes in the feed stock, reactor and regenerator, and changes in charge stock coking tendency. Thus, stability and rapid response capabilities are important in the primary analog loops such as those used in the catalyst section. The catalyst section comprises the regenerator and the reactor and should be provided with good regulation to prevent disturbances from being passed on to other portions of the fluid catalytic cracking system.

H. Kurihara in Optimal Control of Fluid Catalytic Cracking Processes, PhD Thesis, MIT, 1967, proposed a control system for a catalyst section wherein the temperature differential between the regenerator flue gas and the regenerator dense bed is controlled by regulating the flow of regenerator catalyst being circulated to the reactor. The system also calls for controlling dense bed regenerator temperature by adjustment of the air flow rate to the regenerator.

The Kurihara system emphasizes the control of the regenerator over that of the reactor on the premises that the overall dynamices of the catalytic section of a fluid catalytic cracking system are dominated by the regenerator which is generally larger than the reactor, and that the limiting variables for the safety of the regenerator are the regenerator temperature and the oxygen concentration at the outlet of the regenerator bed. The regenerator and the reactor are dynamically coupled through the common variables of catalyst temperature and flow, and coke on catalyst. Thus, this scheme permits the reactor temperature to float under disturbances to maintain the energy balance of the system.

However, in the commercial operations it is often desirable to maintain the reactor temperature reasonably constant to prevent introduction of large disturbances in temperature and composition to the main fractionating column.

SUMMARY OF THE INVENTION

In accordance with the present invention, there is provided a method for controlling the operation of a reactor and a regenerator of a fluid catalytic cracking system wherein a measured temperature of the reactor is compared to a predetermined reactor temperature, and the flow rate of an oxygen-containing gas supplied to the regenerator is adjusted in response to this comparison in a direction to restore the reactor temperature to the predetermined reactor temperature. The method further provides for comparing a measured regenerator flue gas temperature to a predetermined flue gas temperature, and for adjusting the flow rate of regenerated catalyst from the regenerator to the reactor in a direction to restore the flue gas temperature to the predetermined flue gas temperature.

In accordance with another aspect of the present invention, there is provided a system for controlling the catalyst section of a fluid catalytic cracking system comprising means for comparing a measured reactor temperature to a predetermined reactor temperature to generate a reactor temperature deviation, and means for controlling the flow rate of an oxygen-containing gas supplied to the regenerator in a direction to reduce the reactor temperature deviation. The system also includes means for comparing a measured regenerator flue gas temperature to a predetermined regenerator flue gas temperature to obtain a flue gas temperature deviation, and means for controlling the flow rate of the regenerated catalyst to the reactor in a direction to reduce the flue gas temperature deviation.

BRIEF DESCRIPTION OF DRAWING

The figure is a schematic representation of a catalyst section control system in accordance with the present invention.

DESCRIPTION OF SPECIFIC EMBODIMENTS

The figure shows an analog embodiment of the present invention which provides for rapid and stable reactor and regenerator regulation against disturbances, and for minimizing the possibility of passing disturbances to the main fractionating tower. With reference to the figure, an oxygen-containing gas such as air is supplied by a conduit 10 to the lower portion of a regenerator 15 for burning coke from spent catalyst supplied to the regenerator 15. A conduit 17 is connected to the top of the regenerator 15 for venting the regenerator flue gas, or for feeding the flue gas to a carbon monoxide boiler (not shown) where the carbon monoxide is converted to carbon dioxide. A regenerated catalyst line or standpipe 39 extends from the lower portion of the regenerator 15 to a reactor feed conduit 35. An oil feed conduit 37, which typically includes a preheated fresh feed and at least one recycle stream, supplies a feed stock stream to the reactor feed line 35 where the charge picks up the regenerated catalyst from the standpipe 39. The charge and regenerated catalyst is then passed into the reactor 31 at the lower end thereof. Products in a vapor phase (above the dashed line) are removed from the reactor 31 at the upper end thereof by a conduit 33 and passed to a product recovery section which includes at least one fractionator, and a stream of spent or coked catalyst is continuously passed from the reactor 31 to the regenerator 15 by a spent catalyst transfer line 29.

A temperature controller 55 has an adjustable set point control 53 which adjusts the temperature controller 55 to a predetermined set point. A thermo-couple 51 or other temperature indicating means senses the temperature in the reactor 31 and applies a signal representative of the sensed reactor temperature along a line 52 to the temperature controller 55. The temperature controller 55 compares the sensed reactor temperature applied thereto by the line 52 with the set point of predetermined reactor temperature as determined by the setting of the set point control 53, and generates a signal representative of the deviation of the sensed reactor temperature from the predetermined reactor temperature along a line 45 to adjust a control valve 12 in a vent line 11 to thereby adjust the vent rate of the oxygen-containing gas from the line 10.

The adjustment of the vent rate of the oxygen-containing gas in the line 10 is in a direction to decrease the deviation of the sensed reactor temperature from the predetermined reactor temperature. For example, if the reactor deviation signal applied along the line 45 indicates a high reactor temperature, the valve 12 is opened further to increase the vent flow rate in the line 11. As a result, the flow rate of oxygen-containing gas to the regenerator 15 will be decreased to thereby decrease the regenerator temperature. As a result of the lower regenerator temperature, the temperature of the regenerated catalyst in the line 39 is reduced which, in turn, reduces the amount of heat applied to the reactor 31 by the regenerated catalyst, and thus lowers the temperature of the reactor 31.

Conversely, a reactor temperature deviation signal on the line 45 indicative of a low reactor temperature will act to control the valve 12 to reduce the amount of oxygen-containing gas that is vented through the line 11 and, thus increase the amount of oxygen-containing gas supplied by the line 10 to the regenerator 15. Consequently, the temperature of the regenerated catalyst in the standpipe 39 increases, and the heat applied to the reactor 31 by the regenerated catalyst increases to thereby increase the reactor 31 temperature.

The specific embodiment of the figure also provides for controlling the amount of excess oxygen in the upper portion of the regenerator 15 which, in turn, controls the amount of afterburning as a result of a reaction between oxygen and carbon monoxide by controlling the flue gas temperature. The flue gas temperature is a function of afterburning and of regenerator dense phase or bed temperature. The flue gas temperature is sensed by a thermocouple 19 which applies a signal representative of the flue gas temperature along the line 27 to a temperature controller 61. The flue gas temperature is compared with a predetermined flue gas temperature as determined by the setting of a set point control 60. The temperature controller 61 applies a signal representative of the deviation of the flue gas temperature from the predetermined flue gas temperature along a line 62 to adjust a catalyst slide control valve 41, and thereby control the regenerated catalyst flow rate in the standpipe 39 in a direction to reduce the flue gas temperature deviation signal.

When the flue gas temperature signal on the line 27 exceeds the predetermined flue gas temperature as determined by the set point control 60, the temperature controller 61 applies a flue gas temperature deviation signal by way of the line 62 to adjust the valve 41 in a direction to increase the regenerated catalyst flow rate in the standpipe 39 which, in turn, acts to increase the coke burning rate in the regenerator to thereby use more oxygen and thus decrease the amount of excess oxygen in the upper portion of the regenerator 15. Conversely, when the flue gas signal on the line 27 is below the predetermined flue gas temperature, the controller 61 acts to decrease the regenerated catalyst flow rate in the standpipe 39 to thus reduce the coke burning rate in the regenerator dense phase or bed and thus provide an increase in the amount of oxygen for afterburning.

The set point controls 53 and 60 may be manually adjustable to provide a predetermined level of operation, or may be adjusted in response to output control signals from a digital computer.

The present invention also contemplates a purely digital computer controller embodiment in which the temperature readings provided by the thermo-couples 19 and 51 are fed to a computer which is programmed to generate the set points 60 and 53. The temperature as indicated by the output of the thermocouple 19 is compared to the computer generated flue gas temperature set point, and the computer generates an output signal to control the valve 41 in a direction to compensate for deviations of the measured flue gas temperature from the flue gas temperature set point. Further, the computer is programmed to compare the output from the thermo-couple 51 to a reactor temperature set point generated within the computer, and if there is a difference, the computer acts to adjust the valve 12 in a direction to compensate for the deviation of the reactor temperature from the computer generated reactor temperature set point.

The method and apparatus of the present invention is suitable for application in any fluid catalytic cracking system comprising a reactor and a regenerator forming a catalyst section such as that shown in U.S. Pat. No. 3,206,393, which patent is incorporated herein by reference. A typical catalyst section normally includes a level controller responsive to the dense phase bed level in the reactor for controlling a slide valve in the spent catalyst transfer line. Catalyst sections also normally include a differential pressure regulator responsive to a differential pressure between the upper portion of the reactor and the upper portion of the regenerator for controlling a control valve to regulate the regenerator flue gas flow rate to maintain a predetermined pressure difference between the reactor and the regenerator. A level controller and a differential pressure regulator for carrying out these functions are shown in U.S. Pat. No. 3,206,393.

Suitable controllers for carrying out the functions described with reference to the figure are well known in the art. The P+I in parentheses near each of the controllers in the figure indicate that a suitable controller is a proportional and integral controller.

What is claimed is:

1. In a fluid catalytic process for conversion of a hydrocarbon feed stream, wherein said stream is contacted with an active catalyst in a reactor maintained under catalytic conversion conditions to provide reaction products which are removed from said reactor, the catalyst in said reactor becoming contaminated by the deposition of coke thereon, and wherein the contaminated catalyst is circulated from said reactor through a regenerator having a catalyst phase wherein said coke is burned with the evolution of a flue gas by contact with an oxygen-containing gas to thereby regenerate the catalyst and elevate the temperature of the regenerated catalyst before returning the regenerated catalyst to said reactor, the method for controlling the process comprising:

comparing the operating reactor temperature with a predetermined operating reactor temperature to obtain a reactor temperature deviation, adjusting the flow rate of the oxygen-containing gas passed to said regenerator as a sole function of said reactor temperature deviation in a direction to reduce said reactor temperature deviation, comparing the operating regenerator flue gas temperature with a predetermined regenerator flue gas temperature to obtain a regenerator flue gas temperature deviation, and adjusting the flow rate of the regenerated catalyst to said reactor from said regenerator as the sole function of said flue gas temperature deviation and in a direction to reduce said regenerator flue gas temperature deviation.

2. In a system for controlling a fluid catalytic process for conversion of a hydrocarbon feed stream, wherein said stream is contacted with an active catalyst in a reactor maintained under catalytic conversion conditions to provide reaction products which are removed from said reactor, the catalyst in said reactor becoming contaminated by the deposition of coke thereon, and wherein the contaminated catalyst is circulated from said reactor through a regenerator having a catalyst phase wherein said coke is burned with the evolution of a flue gas by contact with an oxygen-containing gas to thereby regenerate the catalyst and elevate the temperature of the regenerated catalyst before returning the regenerated catalyst to said reactor, the combination comprising:

means for comparing an actual reactor temperature with a predetermined reactor temperature to obtain a reactor temperature deviation, means for adjusting the flow rate of the oxygen-containing gas to said regenerator in response to and as a sole function of said reactor temperature deviation, means for comparing an actual regenerator flue gas temperature with a predetermined regenerator flue gas temperature to obtain a regenerator flue gas temperature deviation, and means responsive to said regenerator flue gas temperature deviation for adjusting the flow rate of the regenerated catalyst to said reactor in a direction to reduce said regenerator flue gas temperature deviation.

3. In a system for controlling a fluid catalytic process for conversion of a hydrocarbon feed stream, wherein said stream is contacted with an active catalyst in a reactor maintained under catalytic conversion conditions to provide reaction products which are removed from said reactor, the catalyst in said reactor becoming contaminated by the deposition of coke thereon, and wherein the contaminated catalyst is circulated from said reactor through a regenerator having a catalyst phase wherein said coke is burned with the evolution of a flue gas by contact with an oxygen-containing gas to thereby regenerate the catalyst and elevate the temperature of the regenerated catalyst before returning the regenerated catalyst to said reactor, the combination comprising:

means for generating a signal representative of an actual reactor temperature, means for generating a signal representative of a predetermined reactor temperature, means responsive to said actual reactor temperature signal and to said predetermined reactor temperature signal for generating a signal representative of the deviation of said actual reactor temperature signal from said predetermined reactor temperature signal, means responsive to said reactor temperature deviation signal for adjusting the flow rate of the oxygen-containing gas supplied to said regenerator in response to and as a sole function of said reactor temperature deviation signal, means for generating a signal representative of an actual flue gas temperature, means for generating a signal representative of a predetermined flue gas temperature, means responsive to said actual flue gas temperature signal and to said predetermined flue gas temperature signal for generating a signal representative of the deviation of said actual flue gas temperature signal from said predetermined flue gas temperature signal, and means responsive to said flue gas temperature deviation signal for adjusting the flow rate of the regenerated catalyst to said reactor in a direction to reduce said flue gas temperature deviation signal.

References Cited

UNITED STATES PATENTS

| | | | |
|---|---|---|---|
| 3,591,783 | 7/1971 | Zumwalt | 208—164 X |
| 3,412,014 | 11/1968 | Mattix et al. | 208—164 |
| 3,004,926 | 10/1961 | Goering | 208—Dig. 1 |
| 3,316,170 | 4/1967 | Stewart et al. | 208—164 |
| 3,410,793 | 11/1968 | Stranahan et al. | 208—159 |
| 3,513,087 | 5/1970 | Smith | 208—159 |
| 2,963,422 | 12/1960 | Hann | 208—160 |
| 3,175,968 | 3/1965 | Berger | 208—164 |
| 3,261,777 | 7/1966 | Iscol et al. | 208—113 |

HERBERT LEVINE, Primary Examiner

U.S. Cl. X.R.

23—288 S; 208—DIG. 1; 252—419